Sept. 22, 1970   J. J. KOWALIK ET AL   3,529,410
COTTON HARVESTER
Filed Jan. 8, 1969   2 Sheets-Sheet 1
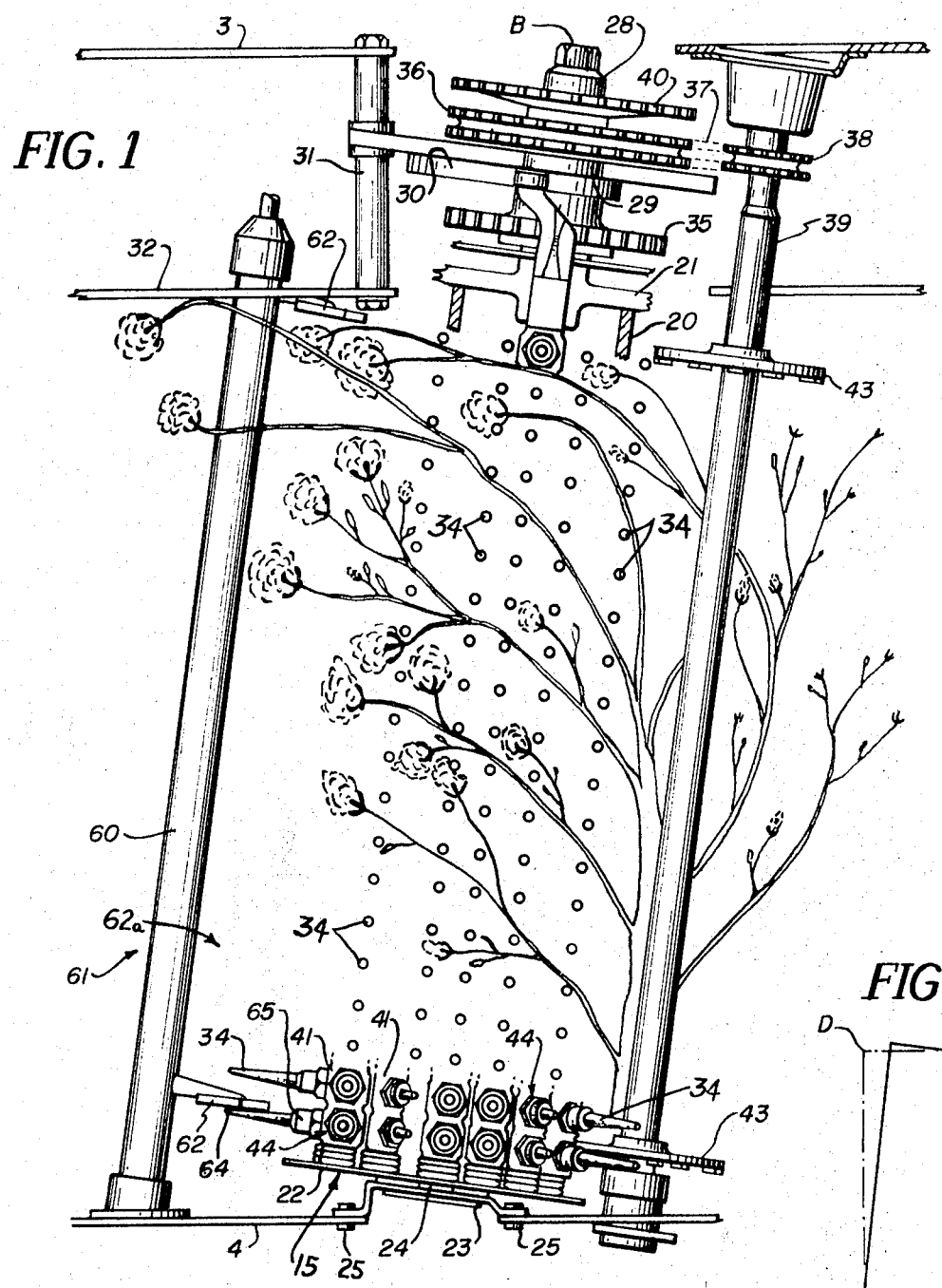
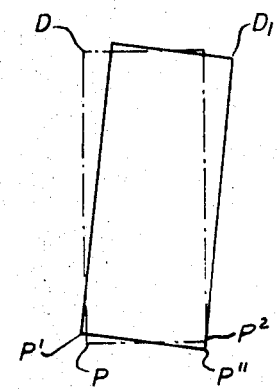
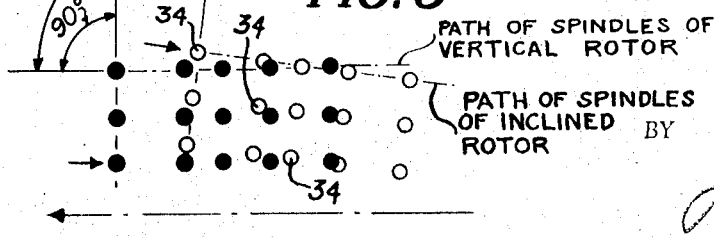
INVENTORS
John J. Kowalik
James M. Francis
James E. Sadler
BY
John J. Kowalik
Atty.

INVENTORS
John J. Kowalik
James M. Francis
James E. Sadler

BY John J. Kowalik
Atty.

3,529,410
COTTON HARVESTER
John J. Kowalik, Glenview, Ill., and James M. Francis and James E. Sadler, Memphis, Tenn., assignors to International Harvester Company, Chicago, Ill., a corporation of Delaware
Filed Jan. 8, 1969, Ser. No. 789,846
Int. Cl. A01d 45/18
U.S. Cl. 56—44
9 Claims

ABSTRACT OF THE DISCLOSURE

A cotton harvester having a plant passage incorporated in the housing which mounts a rotor having a plurality of banks of spindles which enter the front end of the passage and move within the passage with the plants and then exit from the rear of the passage back into the housing into association with means for doffing the cotton from the spindles and means for moistening the spindles prior to re-entry into the plant passage, the rotor being disposed with its axis inclined to the vertical whereby positioning the banks of spindles so their attitude while they move within the passage is inclined thereto and thus the spindles project endwise horizontally within the plant and concurrently move laterally vertically within the plant and thereby cover a greater area of the plant than when the spindles operate in horizontal planes, thus bringing the spindles into proximity with more cotton and thus improving the picking capability of the harvester.

DISCUSSION OF THE PRIOR ART

Cotton harvesters in the type under consideration have since their inception positioned spindles so that they operate in horizontal banks, there being provided spaced intervals between the banks and between adjacent spindles. Successful commercial harvesters have spindles operating in horizontal planes. Various attempts have been made to increase the area of coverage of the spindles within the plant. Various types of belt-mounted spindle combinations with extensive picking zones have been provided to obtain blanket coverage of the plants. Such machines of their very nature are expensive and require numerous movable parts which are not only subject to breakage but also fast wear as has been actually experienced in the field. Furthermore, the areas of coverage of the plant by the spindle are always in horizontal planes.

SUMMARY OF THE INVENTION

The present invention is directed to provision a cotton picker which employs a minimal number of spindles, and wherein the spindles are adapted to traverse a greater area than those of the art while in the plant to thereby improve the loci of the spindles and their likelihood of passing in proximity to the lint cotton.

A broad object of the invention is to provide a cotton picker wherein the picker includes a rotor operating on an inclined axis and wherein the spindles are caused to travel diagonally within the plant passage so as to move vertically within the plant within defined limits in order to place the spindles in proximity to the lint cotton.

A further object of the invention is to provide a novel cotton picker in which the inclination of the picker drum is related to the inclination of the plant as it is entered into the picking passage so as to minimize barking of the plant as the spindles move vertically within the plant.

A still further object of the invention is to provide a novel cotton picker in which incident to the diagonal orientation of the banks of picker spindles, the moistener is similarly located so as to gravitationally flow the moisture from the tip end to the base end of the spindles prior to their entry into the front end of the picking passage, the spindles orbiting at such speed as to centrifugally redistribute the moisture from the base end to the tip end immediately upon exit from the moistener assembly.

A still further object of the invention is to provide an orientation of the doffing mechanism in such a way that the doffers in conjunction with the inclined orientation of the picking spindles, wherein the tip ends point downwardly, are caused to strip the cotton and cast it downwardly and more directly into an air stream of the conveying system which is adapted to carry the cotton to an associated receptacle.

The invention broadly contemplates the provision of the cotton picker in which the rotor is disposed in a novel inclined manner in conjunction with the doffer means and the moistener means in order to increase the efficiency of the cotton picker.

These and other objects and advantages inherent in and encompassed by the invention become more readily apparent from the specification and the drawings wherein:

FIG. 1 is an enlarged sectional view of one of the rotor assemblies of the cotton harvester taken substantially on line 1—1 of FIG. 2;

FIG. 4 is a graphic illustration of the position of the rotor; and

FIG. 5 is an enlarged fragmentary comparison between the position of the spindles in a vertically oriented drum and a drum oriented in accordance with the invention, the portion being taken substantially in the area indicated by brackets X—X of FIG. 4.

DESCRIPTION OF THE INVENTION

Figure 3:
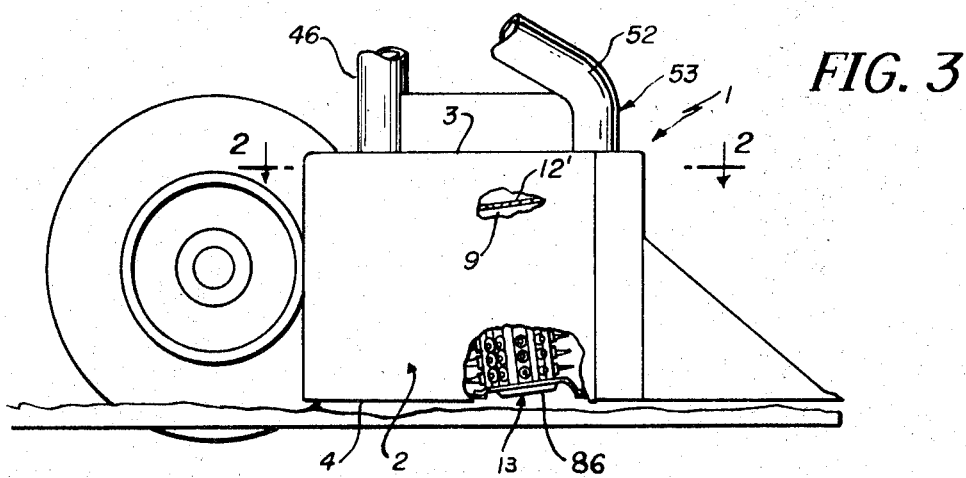
FIG. 3 is a side elevation view partly broken away of one of the picker drums.

Describing the invention in detail and having particular reference to the drawings there is shown a part of a cotton picker generally designated 1, which incorporates a housing 2 having top and bottom walls 3 and 4, front and rear walls 5 and 6 and inboard and outboard wall structures 7 and 8. The housing has a plant tunnel generally designated 9 which is defined by a compressor sheet structure 10 movably hung from the wall structure 7, an opposed slated wall structure 12 and a top wall 12'. It will be observed that the compressor sheet structures 10, 10' and slatted walls 12, 12' at the front and rear respectively of the tunnel 9 are reversely arranged and that a rotor 13 is enclosed within the front compartment 14 of the housing and a rear rotor 15 is enclosed within the rear compartment 16 of the housing. The front and rear rotors have orbital axes indicated at A and B respectively, which are inclined from the vertical in upward and rearward direction parallel to the tunnel at preferably 7°, although a range of up to 17° is contemplated.

Since the rotors 13 and 15 are essentially the same except for the number of spindles, like parts will be identified with like reference numerals. Reference is made to FIG. 1 wherein rotor 15 is illustrated in greater detail, said rotor comprising a center support in form of the tube 20, which at its upper and lower ends is connected to end members 21 and 22, the member 22 being journaled in suitable bearings as well known to those skilled in the art on a spindle support structure 24 which is suitably mounted by means of nut and bolt assemblies 25 to the bottom wall 4 of the housing structure. The upper end member 21 is connected to a shaft 28 integral with the spindle support 20, and the shaft 28 is supported through bearing assembly 29 to the cam track 30 which is suitably supported by means of tie bolt assemblies 31 to top and intermediate walls 3 and 32 of the housing.

Rotor drives for the various components of the rotor are essentially the same as that shown and described in U.S. Pat. No. 2,821,832, in other words each spindle 34 is driven from a master gear 35 which in turn is driven from associated power (not shown) by a chain drive to sprockets 36 which may also be connected by means of chains 37 to the sprockets 38 which are connected to the doffer shaft 39. The timing gear of sprocket 40 is driven as described in connection with the comparable timing sprocket in the aforesaid patent in order to maintain the ground speed of the rotor.

It will be seen that the supporting bars 41 of the front rotor are more numerous than the number of bars of the rear rotor which is conventional in this type of cotton picker. Of essence is the fact that each doffer shaft 39 is disposed substantially parallel to its associated rotor and its axis of rotation so as to dispose the doffer elements 43 one for each bank in parallel relation with the respective banks of spindles 44 so as to remove the cotton from the spindles after they exit from the rear at 45 and 71 of the front and rear portions 68, 70 of the plant passage 9.

Figure 2:
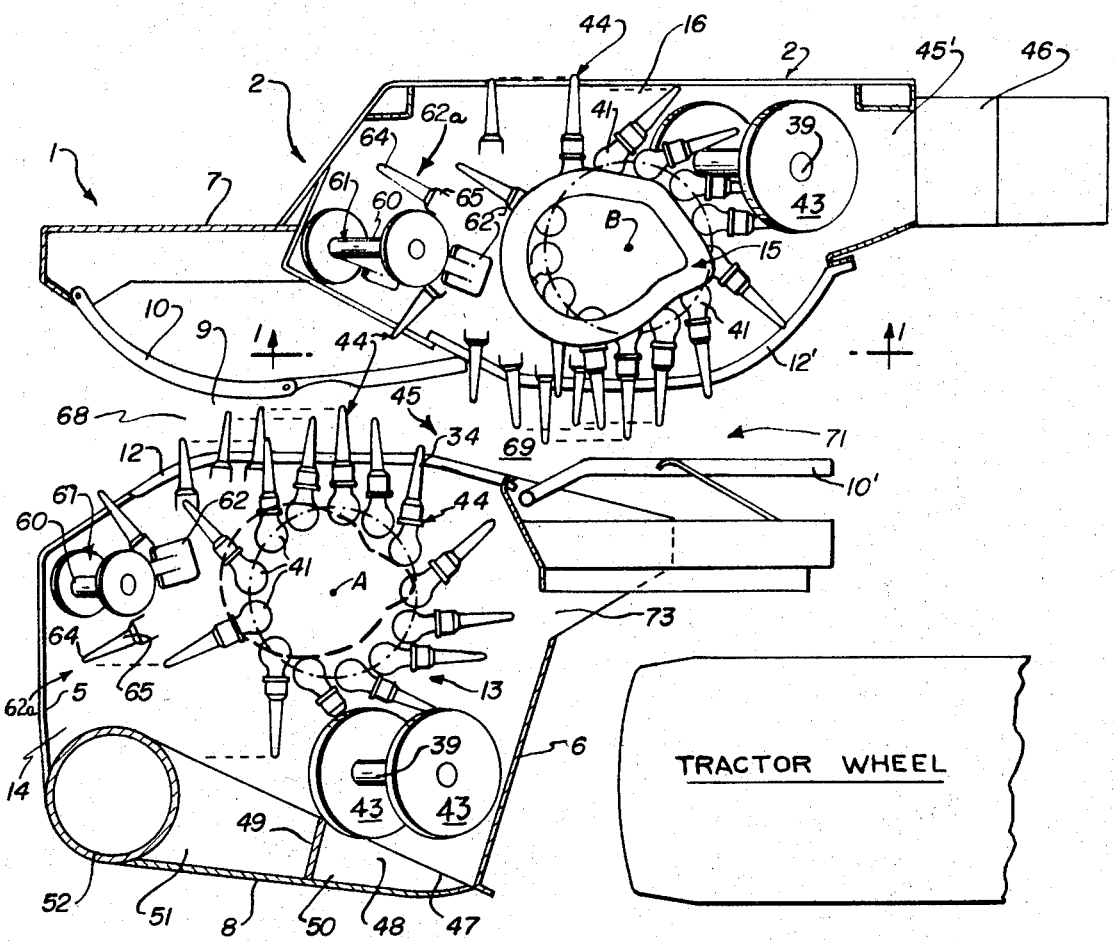
FIG. 2 is a plan view of the cotton section taken substantially on the line 2—2 of FIG. 3.

The doffers have a downward and rearward inclinarear rotor. The doffers cast the cotton laterally downwardly and rearwardly into the rear inlet opening 45' (FIG. 2) of the pneumatic conveyor housing 46 of the rear rotor. The doffers cast the cotton laterally downwardly and outwardly into the opening 47 in the forward housing portion 15 whereby the cotton is adapted to be forcibly thrown toward the bottom wall 48 of the outboard wall structure 8 which is in the form of a door well known to those skilled in the art and the cotton then is adapted to pass under the panel 49 separating the rear chamber 50 from the vacuum chamber 51 which communicates with the outlet tube 52 of the pneumatic conveying system 53 of the front drum as well known to those skilled in the art.

In addition to the orientation of the doffer means a similar orientation is had of the support 60 of each moistener stand generally designated 61 wherein the pads 62 are inclined downwardly and rearwardly in the forward zone generally designated 62a of the rotor wherein the spindles incline downwardly and rearwardly whereby the fluid which is applied to the spindles is caused to migrate from the tip ends 64 of the spindles to their base ends 65 at the time of application and immediately thereafter in view of the rapid movement of the spindles about the respective axes A, or B, the fluid tends to be thrown centrifugally from the base end of each spindle to the tip end thereof prior to its entry into the forward end 68, the front portion of the plant passage 9 or into the front end 69 of the rear portion 71 of the plant passage 9.

A further feature of the invention is in the location of a trash discharge opening 73 in the rear wall 6. In the front rotor 13 where the maximum cotton is picked and the greatest amount of trash is gathered the opening 73 is located adjacent to the peripheral path of the spindles close to their exit from the portion 45 of the front portion of the tunnel 9 and the downward and rearward inclination of the spindles at this location (see FIG. 1) serves to promote and facilitates casting off of the trash such as branches, twigs etc. In other words the attitude of the spindles in this location tends to promote the dislodgement of trash from the spindles in view of the downward and rearward inclination of the spindles. The location of the trash discharge opening 73 is in an area in fore and aft alignment with the region where the spindles are cammed abruptly and swung in a sharp arc.

Reference is made to FIG. 4 of the drawings wherein a diagrammatic illustration is provided showing the relationship between a normally upright rotor D and the inclined rotor designated $D_1$ and it will become apparent that entry of the lowermost spindles of rotor $D_1$ begins at a point P' which is above point P of the conventionally arranged rotor and the trailing end identified at P'' is below the point $P^2$ of the conventional rotor.

In addition, the lower wall portion 85 of the rotors is inclined upwardly and forwardly and provides a bottom abutment surface 86 which will strike any obstruction in the row and easily ride thereover.

What is claimed is:

1. In a cotton harvester, a picker drum comprising a housing with a plant passage therethrough, having front and rear ends, a rotor mounted within the housing for orbital movement about an axis inclined from the vertical in a fore and aft direction, said rotor comprising a plurality of vertically spaced generally parallel banks of rotatable spindles orbital about said axis which is inclined upwardly and rearwardly and moving into said passage at the front end thereof and exiting from the passage at the rear end thereof in paths which have a higher elevation at the front end of the passage and a lower elevation at the rear end of the passage, whereby said spindles travel concurrently vertically within plants in the passage and rearwardly with the plants as they pass through said passage.

2. The invention according to claim 1 and a doffer cooperatively associated with the rotor and comprising doffer disks arranged generally parallel with respective banks of spindles.

3. The invention according to claim 1 and doffer means cooperatively associated with respective banks of spindles and lying in downwardly rearwardly inclined planes and operative to cascade the cotton off the spindles downwardly and rearwardly into an associated collection station.

4. The invention according to claim 2 and moistener means in the housing adjacent to the front end of said passage and having pads disposed in planes paralleling respective banks of spindles and extending downwardly and rearwardly over respective banks, said spindles having tip ends pointed upwardly at said moistener means and base ends downwardly to facilitate migration of moistener fluid onto the spindles from the tips to their base ends, said spindles orbiting at a velocity effective to centrifugally cast the fluid from the base toward the tip ends of the spindles upon said spindles exiting from the moistener means.

5. The invention according to claim 1 and means on the housing at the top of the plant passage serving to bend the upper ends of plants forwardly whereby effecting a downward rearward slope of parts of the plants generally paralleling the paths of movement of the spindles.

6. The invention according to claim 1 and said axis inclined between 7° to 17° from the vertical.

7. The invention according to claim 1 and said housing having a bottom wall inclining upwardly and forwardly and providing abutment areas for deflecting material on the ground beyond a predetermined elevation.

8. The invention according to claim 1 and said housing having a rear wall structure with a trash discharge opening adjacent to the path of said spindles, and said opening directed downwardly and rearwardly.

9. The invention according to claim 1 and said banks of spindles lying in downwardly and rearwardly inclining planes and entering the plant passage at its front end at a high elevation spaced from the ground and exiting from the passage at a low elevation adjacent to the ground.

References Cited

UNITED STATES PATENTS

| | | | |
|---|---|---|---|
| 319,710 | 6/1885 | Haselton | 56—44 |
| 1,802,022 | 4/1931 | Johnston et al. | 56—14 |
| 2,180,568 | 11/1939 | Urschel | 56—40 |
| 3,359,711 | 12/1967 | Hubbard | 56—44 |

RUSSELL R. KINSEY, Primary Examiner